United States Patent
Qian et al.

(10) Patent No.: US 9,916,300 B2
(45) Date of Patent: Mar. 13, 2018

(54) UPDATING HINT LIST BASED ON NUMBER OF STROKES

(71) Applicant: LENOVO (Singapore) PTE, LTD., New Tech Park (SG)

(72) Inventors: Ming Qian, Cary, NC (US); Jian Li, Chapel Hill, NC (US); Song Wang, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/942,177

(22) Filed: Nov. 16, 2015

(65) Prior Publication Data

US 2017/0139898 A1    May 18, 2017

(51) Int. Cl.
*G06F 17/27* (2006.01)
*G06F 3/01* (2006.01)
*G06F 3/0488* (2013.01)
*G06F 3/0482* (2013.01)

(52) U.S. Cl.
CPC ............ *G06F 17/276* (2013.01); *G06F 3/018* (2013.01); *G06F 3/0482* (2013.01); *G06F 3/0488* (2013.01)

(58) Field of Classification Search
CPC .............................. G06F 3/018; G06F 3/04883
See application file for complete search history.

(56) References Cited

U.S. PATENT DOCUMENTS

| | | | | |
|---|---|---|---|---|
| 5,426,711 | A * | 6/1995 | Kitamura | G06K 9/6807 382/187 |
| 6,154,758 | A * | 11/2000 | Chiang | G06F 17/21 715/263 |
| 6,766,179 | B1 * | 7/2004 | Shiau | G06F 3/018 341/28 |
| 9,594,505 | B1 * | 3/2017 | Zhai | G06F 3/0482 |
| 2005/0249419 | A1 * | 11/2005 | Rieman | G06K 9/00872 382/229 |
| 2006/0062461 | A1 * | 3/2006 | Longe | G06F 3/018 382/185 |
| 2006/0146028 | A1 * | 7/2006 | Chang | G06F 3/018 345/169 |
| 2006/0238539 | A1 * | 10/2006 | Opstad | G06F 17/214 345/469 |
| 2007/0192311 | A1 * | 8/2007 | Pun | G06F 3/018 |

(Continued)

*Primary Examiner* — Scott Baderman
*Assistant Examiner* — Mario M Velez-Lopez
(74) *Attorney, Agent, or Firm* — Kunzler, PC

(57) ABSTRACT

For updating a character hint list based on a number of additional strokes, an apparatus, method, and computer program product are disclosed. The apparatus may include a touch-sensitive input panel for receiving handwritten character, a processor, and a memory that stores code executable by the processor. The executable code may cause the processor to: determine a hint list based on the handwritten character, the hint list comprising at least one entry, receive at least one additional stroke relating to the handwritten character, and update the hint list based on a number of received additional strokes. The processor may identify a number of post-character strokes corresponding to each entry in the hint list and remove, from the hint list, each entry whose number of post-character strokes is less than the received number of additional strokes.

19 Claims, 10 Drawing Sheets

(56) References Cited

U.S. PATENT DOCUMENTS

| | | | | |
|---|---|---|---|---|
| 2010/0302016 A1* | 12/2010 | Zaborowski | ............ | G06F 3/018 340/407.2 |
| 2011/0006929 A1* | 1/2011 | Fux | ......................... | G06F 3/018 341/24 |
| 2013/0127728 A1* | 5/2013 | Park | ......................... | G06F 3/017 345/168 |
| 2014/0160032 A1* | 6/2014 | Che | .................... | G06F 3/04886 345/173 |
| 2014/0210759 A1* | 7/2014 | Toriyama | ............ | G06F 17/2735 345/173 |
| 2014/0253457 A1* | 9/2014 | Lee | ......................... | G06F 3/018 345/171 |
| 2014/0361983 A1* | 12/2014 | Dolfing | ............... | G06F 3/04883 345/156 |
| 2016/0062634 A1* | 3/2016 | Kurita | ................... | G06F 17/242 715/268 |
| 2017/0139885 A1* | 5/2017 | Qian | ......................... | G06F 17/24 |

\* cited by examiner

Characters including the character radical "又" ← 490

| Number of Post-Radical Strokes | 1 | 2 | 3 | 4 | 6 | 8 | 11 |
|---|---|---|---|---|---|---|---|
| Candidate Characters | 又 | 双 | 对 | 欢 | 恨 | 难 | 叠 |
| | | 邓 | 圣 | 观 | | 桑 | |
| | | 劝 | | | | | |

FIG. 4B

UPDATING HINT LIST BASED ON NUMBER OF STROKES

FIELD

The subject matter disclosed herein relates to look-ahead auto-completion hint lists and more particularly relates to dynamically updating of Chinese-character based look-ahead auto-completion hint lists using a detected number of strokes.

BACKGROUND

Description of the Related Art

For Mandarin Chinese look-ahead auto-completion, the hint list is generated based on the last radical or character-forming sub-character detected. Because the hint lists are generated at the sub-character-level, there is no hint list updating until the next sub-character or the whole character is written out. In between two detectable sub-characters, the hint list stays as the same and sometimes the size of hint list is unmanageably large.

BRIEF SUMMARY

An apparatus for updating a character hint list based on a number of additional strokes is disclosed. A method and computer program product also perform the functions of the apparatus.

The apparatus may include a touch-sensitive input panel for receiving a handwritten character, a processor, and a memory that stores code executable by the processor. The processor may determine a hint list based on the handwritten character, the hint list including at least one entry, receive at least one additional stroke relating to the handwritten character, and update the hint list based on a number of received additional strokes.

In one embodiment, the processor further identifies a number of post-character strokes corresponding to each entry in the hint list, wherein updating the hint list based on the number of received additional strokes includes removing each entry in the hint list whose number of post-character strokes is less than the received number of additional strokes. In another embodiment, the processor further determines a stroke type of each of the at least one additional stroke relating to the handwritten character, wherein updating the hint list based on the number of received additional strokes further includes updating the hint list based on the determined stroke type.

In certain embodiments, determining a hint list based on the handwritten character includes: retrieving a list of candidate characters that include the handwritten character, identifying a writing order of each candidate character in the list of candidate characters, and determining, for each candidate character in the list of candidate characters, whether the candidate character begins with the handwritten character based on the writing order for that candidate character. In some embodiments, receiving at least one additional stroke relating to the handwritten character includes receiving at least one tap, wherein updating the hint list based on the received number of additional strokes includes updating the hint list based on a received number of taps.

The apparatus may further include a button, wherein receiving at least one additional stroke relating to the handwritten character includes receiving button input corresponding to a press of the button, wherein updating the hint list based on the received number of additional strokes includes updating the hint list based on a received number of button presses. In some embodiments, the handwritten character includes a Chinese radical.

The method includes receiving, by use of a processor, a handwritten character, determining a hint list based on the handwritten character, the hint list including at least one entry, receiving at least one additional stroke relating to the handwritten character, and updating the hint list based on a number of received additional strokes.

In some embodiments, the method includes identifying a number of post-character strokes corresponding to each entry in the hint list, wherein updating the hint list based on the number of received additional strokes includes removing each entry in the hint list whose number of post-character strokes is less than the received number of additional strokes. In certain embodiments the method also includes determining a stroke direction of each of the at least one additional stroke relating to the handwritten character, and updating the hint list based on the determined stroke direction.

In certain embodiments, determining a hint list based on the handwritten character includes: retrieving a list of candidate characters that include the handwritten character, identifying a writing order of each candidate character, and determining, for each candidate character in the list of candidate characters, whether the candidate character begins with the handwritten character based on the writing order for that candidate character. In some embodiments, receiving at least one additional stroke relating to the handwritten character includes receiving at least one tap, wherein updating the hint list based on the received number of additional strokes includes updating the hint list based on a received number of taps. In further embodiments, receiving a handwritten character includes receiving handwriting input and wherein receiving at least one tap includes receiving button input.

In some embodiments, receiving a handwritten character includes receiving handwriting input, determining whether the handwriting input forms a handwritten character, identifying a character radical corresponding to the handwritten character in response to the handwriting input forming a handwritten character, and monitoring for another stroke of handwriting input in response to handwriting input not forming a handwritten character. In certain embodiments, determining a hint list based on the handwritten character includes retrieving a list of characters that include the character radical. In one embodiment, the handwritten character includes a component of a Chinese character.

The program product includes a computer readable storage medium that stores code executable by a processor, the executable code including code to perform: determining a hint list based on a handwritten character, the hint list including at least one entry, receiving at least one additional stroke relating to the handwritten character, and updating the hint list based on a number of received additional strokes.

In some embodiments, the program product includes code to perform: identifying a number of post-character strokes corresponding to each entry in the hint list, wherein updating the hint list based on the number of received additional strokes includes removing each entry in the hint list whose number of post-character strokes is less than the received number of additional strokes. In certain embodiments, determining a hint list based on the handwritten character includes retrieving a list of candidate characters that include the handwritten character, identifying a writing order of each candidate character, and determining, for each candidate character in the list of candidate characters, whether the candidate character begins with the handwritten character based on the writing order for that candidate character.

In some embodiments, receiving at least one additional stroke relating to the handwritten character includes receiving at least one tap, wherein updating the hint list based on the received number of additional strokes includes updating the hint list based on a received number of taps.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4B is a table illustrating a character dictionary including a number of post-radical strokes for each character;

DETAILED DESCRIPTION

Figure 1:
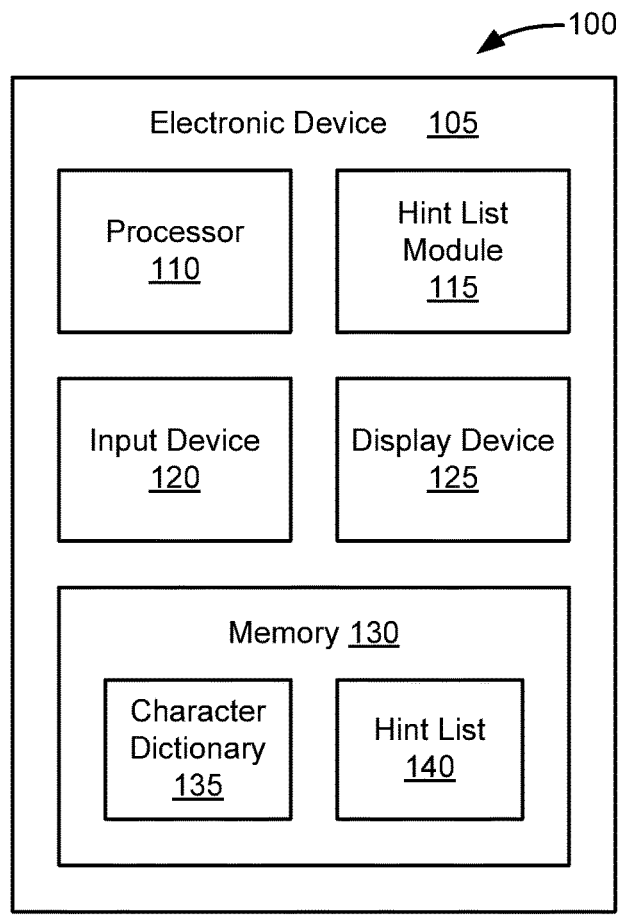
FIG. 1 is a schematic block diagram illustrating one embodiment of a system for updating a character hint list based on a number of additional strokes.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatus, methods, and computer program product describe receiving handwriting input comprising a character (e.g., a Chinese character radical), generating a hint list based the received character (e.g., character radical), receiving information regarding additional strokes (e.g., additional strokes needed to form an intended Chinese character), and updating the hint list based on the number of additional strokes. Beneficially, the information from the additional strokes allows narrowing the hint list to a more useful selection. Accordingly, the disclosed embodiments use a count of the strokes generated after the radical/sub-character generation, and reduce the size of hint list continuously as more strokes being generated. Thus, the hint list evolves as additional strokes are input, thereby making it easier for the user to find the intended character.

FIG. 1 is a schematic block diagram illustrating a system 100 for updating a character hint list based on a number of additional strokes. The system 100 includes an electronic device 105. In one embodiment, the electronic device 105 includes a processor 110, a memory 130, a hint list module 115, an input device 120, and a display device 125.

The electronic device 105 may be any digital device capable of executing computing processes using a microprocessor, microcontroller, or other processing device, including, but not limited to, a general-purpose computing device, a special-purpose (dedicated) computing device, and the like. In some embodiments, the electronic device 105 may be a personal computer, including, but not limited to, a mobile phone, a smart phone, a tablet computer, a laptop computer, a handheld computer, a wearable computer, a desktop computer, a gaming console, or the like.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In certain embodiments, the processor 110 may include a plurality of processing units, such as a plurality processing cores, a plurality of CPUs, a plurality of microcontrollers, or the like. In some embodiments, the processor 110 executes instructions stored in the memory 130 to perform the methods and routines described herein. The processor 110 is communicatively coupled to the hint list module 115, the input device 120, the display device 125, and the memory 130.

The hint list module 115, in one embodiment, is configured to receive handwriting input comprising a character (e.g., a Chinese character radical) from the input device 120 and generate a hint list 140 of candidate characters based the received character (e.g., character radical), as described in further detail below. In some embodiments, the hint list module 115 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

The input device 120, in one embodiment, may comprise any known computer input device including a touch panel, a button, a keyboard, and the like. For example, the input device 120 may be a handwriting input unit operatively coupled to the processor 110. In some embodiments, the input device 120 may be integrated with the display device 125, for example as a touchscreen or similar touch-sensitive display. In some embodiments, the input device 120 comprises a touchscreen wherein the user may handwrite characters (e.g., Chinese characters) on the touchscreen. In some embodiments, the user may handwrite the character using a stylus or electronic pen. In other embodiments, the user may handwrite the character using a finger, hand, or the like. Accordingly, the input device 120 may be configured to receive input from both a stylus and from the user's finger.

In one embodiment, the input device 120 includes a touchscreen configured to both receive handwritten strokes and also to recognize taps on the touchscreen. For example, the user input one or more handwritten strokes that form a character radical and may further indicate that the full character to be input includes one or more additional strokes by tapping the touchscreen (e.g., with a finger, stylus, electronic pen, or the like) for each additional stroke. Accordingly, the input device 120 may receive one or more handwritten strokes that comprise a handwritten character and may further receive one or more taps indicating additional strokes of the character to be input.

In certain embodiments, the input device 120 comprises two or more different input devices, such as a touchscreen and a button for indicating an additional character stroke. The user may initially handwrite a character using the touchscreen and then use the button to indicate that the full character includes one or more additional strokes. Accordingly, receiving a handwritten character may include the input device 120 receiving handwriting input, wherein receiving one or more taps indicative of additional strokes may include receiving button input indicative of additional strokes.

The display device 125, in one embodiment, may comprise any known electronic display capable of outputting visual data to a user. For example, the display device 125 may be an LCD display, an LED display, an OLED display, a projector, or similar display device capable of outputting images, text, characters, and the like to a user. In some embodiments, the display device 125 may be integrated with at least a portion of the input device 120. For example, the display device 125 and a portion of the input device 120 may be combined to form a touchscreen or similar touch-sensitive display. The display device 125 may receive data for display from the processor 110, the hint list module 115, and/or the memory 130.

The memory 130, in one embodiment, is a computer readable storage medium. In some embodiments, the memory 130 includes volatile computer storage media. For example, the memory 130 may include a random access memory (RAM), including dynamic RAM (DRAM), synchronous dynamic RAM (SDRAM), and/or static RAM (SRAM). In some embodiments, the memory 130 includes non-volatile computer storage media. For example, the memory 130 may include a hard disk drive, a flash memory, or any other suitable non-volatile computer storage device. In some embodiments, the memory 130 includes both volatile and non-volatile computer storage media.

In some embodiments, the memory 130 stores a character dictionary 135. The character dictionary comprises a plurality of characters and information related to how a character is written. In one embodiment, the information relating to how a character is written includes, but is not limited to, character composition information and character writing order information. The character composition information may include any radicals or other sub-characters included in the character, a number of strokes comprising the character (or radical/sub-character), types and/or directions of strokes comprising the character, and the like. The hint list module 115 may select characters from the character dictionary 135 for inclusion into the hint list 140 based on the user input, as described in greater detail below.

In further embodiments, the memory 130 stores additional data relating to updating a character hint list based on a number of additional strokes, for example, the memory 130 may store a character dictionary 135, a hint list 140, and the like. The character dictionary 135, in one embodiment, is a Chinese character dictionary comprising a plurality of Chinese characters. The character dictionary 135 may be organized based on Chinese character radicals, wherein each Chinese character is listed under its character radical. The hint list 140, in one embodiment, may be a list of candidate characters. Each entry in the hint list 140 may be a candidate character due to the entry comprising the handwritten character recognized by the hint list module 115. In some embodiments, the memory 130 also stores program code and related data, such as an operating system or other controller algorithms operating on the electronic device 105.

Figure 2:
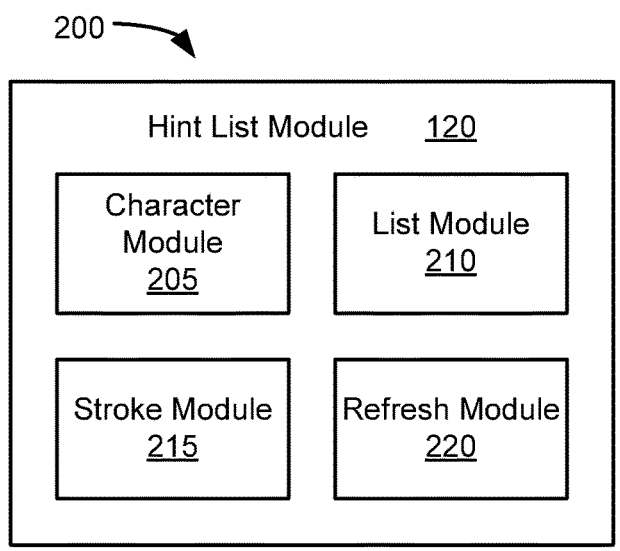
FIG. 2 is a schematic block diagram illustrating one embodiment of an apparatus for updating a character hint list based on a number of additional strokes.

FIG. 2 is a schematic block diagram illustrating hint list apparatus 200 for updating a character hint list based on a number of additional strokes. The hint list apparatus 200 includes a hint list module 115. In some embodiments, the hint list module 115 is substantially similar to the hint list module 115 described above with reference to FIG. 1. In one embodiment, the hint list module 115 includes a character module 205, a list module 210, a stroke module 215, and a refresh module 220. The modules 205-220 may be communicatively coupled to one another.

The character module 205, in one embodiment, is configured to receive a handwritten character from the input device 120. As used herein, a handwritten character refers to a character from a written language that is input (e.g., via the input device 120) by the user handwriting the character. In one embodiment, the handwritten character is a character radical of the Chinese character. In some embodiments, the user may handwrite the character using a stylus or electronic pen. In other embodiments, the user may handwrite the character using a finger, hand, or the like.

In some embodiments, the character module 205 receives the handwritten character by receiving handwriting input comprising one or more strokes. As used herein, a stroke refers to a continuous movement of a writing instrument (e.g., a stylus, electronic pen, or user's finger) on a writing surface (e.g., a touch-sensitive panel of the input device 120). A stroke begins when the writing instrument touches the writing surface and ends when the writing instrument is lifted from the writing surface. A stroke may be a straight line, a curved line (e.g., a bent or hooked stroke), a jointed line, a circle, a dot, or combinations thereof. In some embodiments, the stroke may be a basic stroke consisting of a single, simple stroke. In other embodiments, the stroke may be a compound stroke where two or more basic strokes are combines in the same movement (e.g., between first placing the writing instrument on the writing surface and subsequently lifting it from the writing surface).

In response to receiving handwritten input, the character module 205 may determine whether the handwriting input (e.g., the one or more strokes) forms a handwritten character. For example, the character module 205 may employ an image recognition routine, or similar algorithm, to determine whether the handwriting input forms a character radical of the Chinese character.

In certain embodiments, the character module 205 identifies a computer usable character corresponding to the handwritten character, in response to handwriting input forming a handwritten character. For example, the character module 205 identify a computer usable character encoding, such as a Unicode encoding, that corresponds to the handwritten character recognized by the image recognition routine. In other embodiments, the character module 205 may monitor for another stroke of handwriting input in response to determining that the handwriting input (e.g., the one or more strokes) does not form a handwritten character.

In one embodiment, the character module 205 communicates the handwritten character (e.g., a computer usable encoding of the handwritten character) to list module 210. In another embodiment, the character module 205 stores the handwritten character (or a computer usable encoding of the handwritten the character) to a location in the memory 130 accessible by other components and/or modules of the electronic device 105. For example, the character module 205 may store a Unicode encoding of the handwritten character to a specific location in the memory 130.

The list module 210, in one embodiment, is configured to determine a hint list (e.g., the list 140) based on the handwritten character, the hint list comprising at least one entry. As used herein, a hint list refers to a collection of characters which may be formed using the handwritten character. As such, each character in the hint list must contain the handwritten character. In one embodiment, the list module 210 receives an indication of the handwritten character (e.g., receives a computer usable encoding of the handwritten character) from the character module 205. In another embodiment, the list module 210 retrieves an indication of the handwritten character from a location in the memory 130. For example, the list module 210 may retrieve a Unicode encoding of the handwritten character from a specific location in the memory 130.

In some embodiments, the list module 210 determines the hint list 140 by accessing a character dictionary 135 stored in the memory 130. The list module 210 may parse the character dictionary 135 to identify one or more candidate characters, wherein each candidate character contains the handwritten character recognized by the character module 205. The list module 210 may add to the hint list 140 each candidate character containing the recognized handwritten character.

In one embodiment, the list module 210 identifies a writing order of each candidate character and determines whether the candidate character begins with the handwritten character. For example, based on the writing order, the list module 210 may determine, for each candidate character in the list of candidate characters, if the handwritten character recognized by the character module 205 is a first occurring component of the candidate character. The list module 210 may add to the hint list 140 only those candidate characters beginning with the recognized handwritten character.

The stroke module 215, in one embodiment, is configured to monitor for at least one additional stroke relating to the handwritten character. In some embodiments, the stroke module 215 receives input data from the input device 120 corresponding to at least one additional handwritten stroke. The stroke module 215 may analyze the received input data to determine a number of additional strokes. In other embodiments, the stroke module 215 receives an indication from the input device 120 of additional strokes. In one embodiment, the indication of additional strokes may include an indication of a number of additional strokes.

In some embodiments, the indication from the input device 120 of additional strokes may comprise an indication that the input device 120 has received one or more taps. For example, the user may tap a touchscreen input device 120 (e.g., with a finger, stylus, or electronic pen) instead of writing out the additional strokes. Thus, the user may tap the touchscreen input device 120 one time for each additional stroke (e.g., beyond the character radical) of an overall character the user desires to input.

Accordingly, monitoring for at least one additional stroke relating to the handwritten character may include the stroke module 215 monitoring for an indication that the input device 120 has received one or more taps. In one embodiment, the stroke module 215 may identify a number of times the user taps the touchscreen input device 120. In another embodiment, the stroke module 215 may receive an indication of the received number of taps from the touchscreen input device 120.

In certain embodiments, the indication from an input device 120 of additional strokes may comprise an indication that the input device 120 has received one or more button presses. For example, the input device 120 may comprise a button for indicating additional strokes, wherein the user may press the button instead of writing out the additional strokes. Thus, the user may press the button for indicating additional strokes one time for each additional stroke (e.g., beyond the character radical) of an overall character the user desires to input.

Accordingly, monitoring for at least one additional stroke relating to the handwritten character may include the stroke module 215 monitoring for an indication that the user presses a button for indicating additional strokes. In one embodiment, the stroke module 215 may identify a number of times the user presses the button for indicating additional strokes. In another embodiment, the stroke module 215 may receive an indication of the received number of button presses from the input device 120.

In certain embodiments, the stroke module 215 may communicate information regarding the additional strokes to the refresh module 220, including communicating an indication of the number of additional strokes. In other embodiments, the stroke module 215 may store information regarding the additional strokes, including at least the number of additional strokes, to a location in the memory 130 accessible by other components and/or modules of the electronic device 105. For example, the stroke module 215 may store the number of additional strokes at a specific location in the memory 130, wherein refresh module 220 retrieves the number of additional strokes from the specific location in memory 130.

Where the user indicates the additional strokes with taps (e.g., by tapping a touchscreen input device 120), the stroke module 215 may communicate the number of taps to the refresh module 220. Alternatively, the stroke module 215 may store the number of taps to the memory 130. Where the user indicates the additional strokes with button presses, the stroke module 215 may communicate the number of button presses to the refresh module 220. Alternatively, the stroke module 215 may store the number of button presses to the memory 130.

The refresh module 220, in one embodiment, is configured to update (refresh) the hint list 140 based on a number of received additional strokes. In one embodiment, the refresh module 220 receives an indication of the number of additional strokes from the stroke module 215. In another embodiment, the refresh module 220 retrieves an indication of the number of additional strokes from a location in the memory 130. Where the user indicates the additional strokes with taps, the refresh module 220 may update the hint list 140 based on a number of taps. Where the user indicates the additional strokes with button presses, the refresh module 220 may update the hint list 140 based on a number of button presses.

In some embodiments, the refresh module 220 updates the hint list 140 based on a number of received additional strokes (or taps or button presses) by parsing the existing hint list 140 and identifying a number of post-character strokes associated with each candidate character in the existing hint list 140 (e.g., number of strokes, beyond the character radical recognized by the stroke module 205, required to form the candidate character). As used herein, a post-character stroke refers to a stroke required to form a character that is written after the character radical identified by the character module 205. The refresh module 220 may then remove from the existing hint list 140 any candidate characters whose number of post-character strokes is less than the number of received additional strokes (or taps or button presses), thereby updating the hint list 140.

In embodiments where the user writes out the additional strokes, the refresh module 220 may instruct the character module 205 to determine whether at least one of the additional strokes, in combination with the character previously identified by the character module 205, forms a new character. For example, some character radicals in the written Chinese language are single stroke characters, while other character radicals are multi-stroke characters. Thus, the character module 205 may recognize a character radical from a single stroke, while one or more additional strokes combine with the single stroke character radical to form a new, multi-stroke character radical. In such situations, the character module 205 may identify the new character (e.g., new, multi-stroke character radical), and the list module 210 may generate a new hint list 140 based on the newly recognized character form from the old the character and at least one additional stroke.

Figure 3:
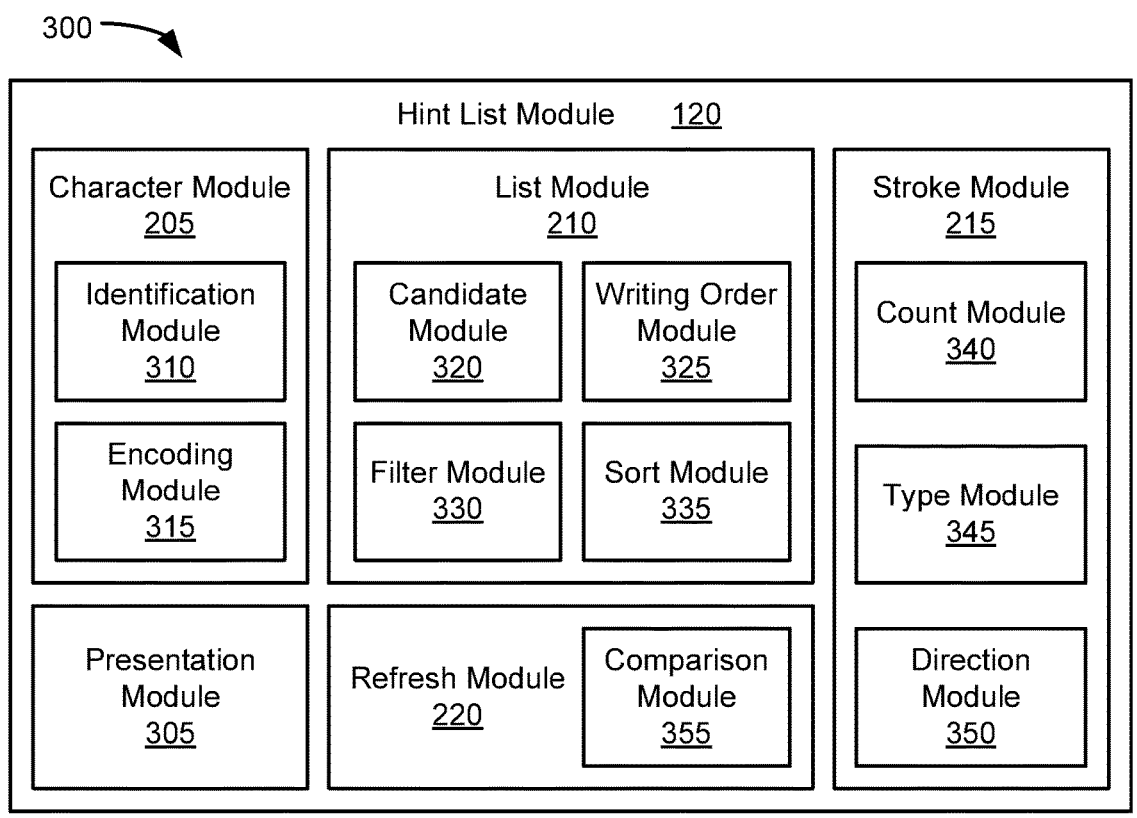
FIG. 3 is a schematic block diagram illustrating another embodiment of an apparatus for updating a character hint list based on a number of additional strokes.

FIG. 3 is a schematic block diagram illustrating a hint list apparatus 300 for updating a character hint list based on a number of additional strokes. The hint list apparatus 300 includes a hint list module 115. In some embodiments, the hint list module 115 is substantially similar to the hint list module 115 described above with reference to FIGS. 1 and 2. The hint list module 115 includes a character module 205, a list module 210, a stroke module 215, and a refresh module 220. As depicted, the hint list module 115 may also include a presentation module 305, an identification module 310, an encoding module 315, a candidate module 320, a writing order module 325, a filter module 330, a sort module 335, a count module 340, a type module 345, a direction module 350, and/or a comparison module 355. The modules 205-220 and 305-355 may be communicatively coupled to one another. The hint list module 120 may comprise hardware circuits, program code operating on a processing device, or a combination of hardware circuitry and program code.

The character module 205, the list module 210, the stroke module 215, and the refresh module 220 may be substantially as described above with reference to FIG. 2. Further the modules 205-220 may include one or more components or submodules, as depicted in FIG. 3 and as described in further detail below. Each of the modules 205-220 may comprise hardware circuits, program code operating on a processing device, or a combination of hardware circuitry and program code.

The presentation module 305, in one embodiment, is configured to display the hint list on the display device 125. For example, the presentation module 305 may convert the list 140 into image data for displaying on the display device 125. In some embodiments, the presentation module 305 may control the display device 125 by sending image data for displaying the hint list 140. In other embodiments, the presentation module 305 may store image data for displaying the hint list 140 at a location in the memory 130, wherein the processor 110 controls the display device 125 to display the stored image data.

In some embodiments, the presentation module 305 may display only a portion of the hint list 140. For example, the presentation module 305 may identify an amount of space on screen that is available for displaying the hint list 140. The presentation module 305 may then determine a number of candidate characters displayable within the identified space. Thereafter, the presentation module 305 may select up to the determined number of candidate characters and display the selected candidate characters. In one embodiment, the presentation module 305 selects the candidate characters sequentially from the beginning of the hint list 140, wherein the candidate characters within the hint list 140 are ordered based on a likelihood that the user intends to input that candidate character. The presentation module 305 may comprise hardware circuits, program code operating on a processing device, or a combination of hardware circuitry and program code.

The identification module 310, in one embodiment, is configured to recognize a character from handwriting received via the input device 120. In one embodiment, the identification module 310 may recognize a Chinese character radical from the received handwriting. In some embodiments, the identification module 310 uses one or more image recognition routines to identify the handwritten character input by the user. For example, the identification module 310 may identify the strokes used to make the handwritten character, including stroke type (basic, compound, etc.), stroke order, and stroke location. Based on the strokes comprising handwritten character, the identification module 310 may identify a Chinese character, such as a character radical, corresponding to the handwritten character.

In some embodiments, the identification module 310 may reference a character dictionary 135 in order to identify the handwritten character. For example, the character dictionary 135 may include information relating to the strokes comprising each character in the character dictionary 135, such as stroke type, stroke order, and stroke location. The identification module 310 may parse the character dictionary 135 for characters matching the input character (e.g., handwritten character). Generally, the handwritten character will be a character radical of a Chinese character. Further, and the character will typically be a simple character radical comprising few strokes. Therefore, in some embodiments the identification module 310 may reference only the portion of the character dictionary containing character radicals and/or characters comprising few strokes.

Having recognized a character from handwriting received via the input device 120, the identification module 310 may communicate the recognized character to one or more modules, such as to the list module 210, the presentation module 305, the encoding module 315, or other modules in the electronic device 105. In some embodiments, the identification module 310 may transmit the recognized character (or an indication thereof) to the one or more modules. In other embodiments, the identification module 310 may store the recognized character (or an indication thereof) to a location in the memory 130 accessible by the one or more modules.

The identification module 310 may comprise hardware circuits, program code operating on a processing device, or a combination of hardware circuitry and program code. As depicted, the identification module 310 may be a component of the character module 205. For example, the identification module 310 may be a hardware component of the character module 205. As another example, the identification module 310 may be a subroutine of the character module 205. However, in other embodiments the identification module 310 may be an independent component communicatively coupled to the character module 205.

The encoding module 315, in one embodiment, is configured to translate the handwritten strokes representing an input character (including a character radical or a subcharacter) into a computer usable character (e.g., a character encoding). The character encoding represents a print character or digital character displayable on the display device 125. For example, encoding module 315 may translate the handwritten strokes into a Unicode character or other character encoding. In one embodiment, the encoding module 315 may indicate the computer usable character to the list module 210 wherein the list module 210 determines the hint list 140 based on the computer usable character (e.g., character encoding). In another embodiment, the encoding module 315 may indicate the computer usable character to the presentation module 305, wherein the presentation module 305 displays the digital representation of the input character based on the computer usable character.

The encoding module 315 may comprise hardware circuits, program code operating on a processing device, or a combination of hardware circuitry and program code. As depicted, the encoding module 315 may be a component of the character module 205. For example, the encoding module 315 may be a hardware component of the character module 205. As another example, the encoding module 315 may be a subroutine of the character module 205. However, in other embodiments the encoding module 315 may be an independent component communicatively coupled to the character module 205.

The candidate module 320, in one embodiment, is configured to identify one or more candidate characters based on the handwritten character recognized by the character module 205 (e.g., the handwritten character radical). For example, the candidate module 320 may compile a list of candidate characters that include the handwritten character. In some embodiments, the candidate module 320 accesses the character dictionary 135 in order to identify the one or more candidate characters. The candidate module 320 may identify one or more characters that contain the handwritten character.

In one embodiment, the character dictionary 135 may be indexed by character radical, wherein the candidate module 320 looks up entries using the recognized handwritten character. Accordingly, the candidate module 320 may create a list of candidate characters, wherein the list of candidate characters includes all entries in the character dictionary 135 indexed with the handwritten character. In another embodiment, the candidate module 320 may parse the character dictionary 135 to identify all characters including the handwritten character, wherein the list of candidate characters includes all entries in the character dictionary 135 which contain the handwritten character.

In some embodiments, the candidate module 320 may communicate the list of candidate characters to the writing order module 325 and/or the filter module 330. In certain embodiments, the candidate module 320 sends the list of candidate characters directly to the modules 325 and/or 330. In other embodiments, the candidate module 320 may store the list of candidate characters at a location in the memory 130, wherein the modules 325 and/or 330 retrieve the list of candidate characters from the location of the memory 130.

The candidate module 320 may comprise hardware circuits, program code operating on a processing device, or a combination of hardware circuitry and program code. As depicted, the candidate module 320 may be a component of the list module 210. For example, the candidate module 320 may be a hardware component of the list module 210. As another example, the candidate module 320 may be a subroutine of the list module 210. However, in other embodiments the candidate module 320 may be an independent component communicatively coupled to the list module 210.

The writing order module 325, in one embodiment, is configured to determine a writing order for each on the candidate characters in the list of candidate characters. As is understood in art, Chinese characters and other logograms based on Chinese characters have a writing order, where certain components of the character are written before other components of the character. Accordingly, certain Chinese characters may include the recognized handwritten character even if they do not begin with the recognized handwritten character.

Accordingly, writing order module 325 may identify, for each candidate character in the list of candidate characters, writing order information including a first written character radical or other character component. Beneficially, by identifying the writing order of each candidate character, the writing order module 325 enables list module 210 to determine a more accurate hint list 140, by facilitating elimination of those candidate characters which include the recognized handwritten character, but do not begin with the recognized handwritten character.

In some embodiments, the writing order module 325 provides the writing order (including the first written character radical) to the filter module 330, wherein the filter module 330 may remove from consideration any candidate character which does not begin with the handwritten character (e.g., handwritten character radical) recognized by the character module 205. In certain embodiments, the writing order module 325 may send writing order information to the filter module 330. In other embodiments, the writing order module 325 may store writing order information in the memory 130, for example at a location accessible by the filter module 330.

The writing order module may comprise hardware circuits, program code operating on a processing device, or a combination of hardware circuitry and program code. As depicted, the writing order module may be a component of the list module 210. For example, the writing order module may be a hardware component of the list module 210. As another example, the writing order module may be a subroutine of the list module 210. However, in other embodiments the writing order module may be an independent component communicatively coupled to the list module 210.

The filter module 330, in one embodiment, is configured to determine, for each candidate character in the list of candidate characters, whether the candidate character begins with the handwritten character recognized by the character module 205. The filter module 330 may determine whether the candidate character begins with the handwritten character (e.g., character radical) based on the writing order for each candidate character identified by the writing order module 325. Further, the filter module 330 may be configured to add each character determined to begin with the handwritten character to the hint list 140, so that the interest 140 only contains characters that begin handwritten character (e.g., handwritten character radical).

In some embodiments, the user may input one or more additional strokes which, when combined with the handwritten character, form a new character radical. In such circumstances, the filter module 330 may be configured to clear the hint list 140, receive a new list of candidate characters (e.g., from the candidate module 320, and determine whether the candidate characters in the list of candidate characters begin with the new character radical. Consequently, the filter module 330 may repopulate the hint list 140 with each candidate character that begins with a new character radical, as determined based on the writing order for that candidate character.

The filter module 330 may comprise hardware circuits, program code operating on a processing device, or a combination of hardware circuitry and program code. As depicted, the filter module 330 may be a component of the list module 210. For example, the filter module 330 may be a hardware component of the list module 210. As another example, the filter module 330 may be a subroutine of the list module 210. However, in other embodiments the filter module 330 may be an independent component communicatively coupled to the list module 210.

The sort module 335, in one embodiment, is configured to arrange the entries of the hint list prior to display on the display device 125. In some embodiments, the sort module 335 arranges the entries of the hint list 140 based on popularity, based on likelihood of matching what the user has input (e.g., the handwritten character and any additional strokes), or based on other metrics. For example, if the hint list 140 contains twenty characters that match the handwritten character (e.g., handwritten character radical) and any additionally input strokes, the sort module 335 may identify, for each character in the hint list 140, a likelihood that the user intends to input that character. Further, the sort module 335 may arrange the twenty characters in order of highest likelihood to Lois likelihood.

In some embodiments, the sort module 335 modifies the hint list 140 by changing the order of the candidate characters within the hint list 140. In other embodiments, the sort module 335 may store a sort order for the hint list 140 separate from the hint list 140, wherein the presentation module 305 accesses the sort order and presents candidate characters in the hint list 140 in an order indicated by the sort order. Additionally, each time the hint list 140 is updated, for example by the refresh module 220, the sort module 335 may re-determine the sort order and either update the order of the candidate characters within hint list 140 or update the sort order associated with the hint list 140 (but stored separately from the hint list 140).

In one embodiment, the sort module 335 accesses information stored in the memory 130 in order to determine a popularity of the candidate character and/or a likelihood that the user intends to input the character candidate. In another embodiment, the sort module 335 may access information stored at an external source, such as a remote server or database, in order to determine a popularity of the candidate character and/or a likelihood that the user intends to input the character candidate.

The sort module 335 may comprise hardware circuits, program code operating on a processing device, or a combination of hardware circuitry and program code. As depicted, the sort module 335 may be a component of the list module 210. For example, the sort module 335 may be a hardware component of the list module 210. As another example, the sort module 335 may be a subroutine of the list module 210. However, in other embodiments the sort module 335 may be an independent component communicatively coupled to the list module 210.

The count module 340, in one embodiment, is configured to track a number of additional strokes input and/or indicated by the user. The count module 340 may monitor input received via the input device 120 and/or monitor a location in the memory 130 in order to identify the number of additional strokes input and/or indicated by the user. In certain embodiments, the count module 340 communicates the number of additional strokes to the refresh module 220. In other embodiments, the count module 340 may store the number of additional strokes to a location in memory 130 accessible by the refresh module 220.

In one embodiment, the count module 340 monitors input received via the input device 1204 additional handwritten strokes input by the user, wherein the count module 340 identifies the number of additional strokes based on a number of handwritten strokes received after the handwritten character identified by the character module 205. In another embodiment, the count module 340 monitors input received from a button used to indicate an additional stroke in order to identify the number of in additional strokes, wherein the count module 340 identifies the number of additional strokes based on a number of button presses received after the handwritten character.

In yet another embodiment, the count module 340 may monitor input received via the input device 120 for taps input after a handwritten character, wherein the count module 340 identifies the number of additional strokes based on a number of taps to the touchscreen received after the handwritten character. Still further, in some embodiments the count module 340 may indicate the number of additional strokes by a combination of input additional strokes, button presses, and/or taps to a touchscreen.

The count module 340 may comprise hardware circuits, program code operating on a processing device, or a combination of hardware circuitry and program code. As depicted, the count module 340 may be a component of the stroke module 215. For example, the count module 340 may be a hardware component of the stroke module 215. As another example, the count module 340 may be a subroutine of the stroke module 215. However, in other embodiments the count module 340 may be an independent component communicatively coupled to the stroke module 215.

The type module 345, in one embodiment, is configured to determine a stroke type of each of the at least one additional stroke relating to the handwritten character. In one embodiment, the type module 345 receives data from the input device 120 regarding the additional stroke, wherein the type module 345 determines a stroke type for the additional stroke based on the received data. In one embodiment, the type module 345 may determine whether the additional stroke is a basic stroke or a compound stroke (e.g., a complex stroke).

As used herein, a basic stroke refers to a single calligraphic stroke moving in one direction across a writing surface. In some embodiments, the basic stroke may be straight, while in other embodiments the basic stroke may be curved. As used herein, a compound (complex) stroke refers to a combination of two or more basic strokes written without lifting the writing instrument from the writing surface.

In certain embodiments, the type module 345 may indicate the determined type to the refresh module 220, wherein the refresh module 220 updates the hint list further based determined stroke direction. For example, the type module 345 may determine that an additional stroke is a basic stroke, wherein the refresh module 220 further updates the hint list to eliminate any characters that do not include a basic stroke after the character radical identified by the character module 205. The type module 345 may communicate directly with the refresh module 220 or may store the determined type at a location in memory 130 accessible by the refresh module 220. Accordingly, the refresh module 220 may update the hint list based on input from the type module 345, as well as from other modules, including the stroke module 215, the count module 340, and/or the direction module 350.

The type module 345 may comprise hardware circuits, program code operating on a processing device, or a combination of hardware circuitry and program code. As depicted, the type module 345 may be a component of the stroke module 215. For example, the type module 345 may be a hardware component of the stroke module 215. As another example, the user grasp module 335 may be a subroutine of the attention state module 210. However, in other embodiments the type module 345 may be an independent component communicatively coupled to the stroke module 215.

The direction module 350, in one embodiment, is configured to identify a direction of a received additional stroke. In one embodiment, the direction module 350 may receive a direction indication from the input device 120. In another embodiment, the direction module 350 may receive an indication of a starting point and an ending point of the additional stroke from the input device 120, wherein the direction module 350 determines the direction of the additional stroke from the starting and ending points. In yet another embodiment, the direction module 350 may receive other data from the input device 120 allowing the direction module 350 to identify the direction of the additional stroke.

In some embodiments, the direction module 350 may determine a direction based on the movement of a stylus, finger, or the like when inputting the additional stroke. For example, the direction module 350 may classify the additional stroke as having an upward direction (e.g., moving upwards), a downward direction, a leftward direction (e.g., moving leftward), and/or a rightward direction. In certain embodiments, the direction module 350 may classify the additional stroke as having a diagonal direction, the diagonal direction being a combination of an upward/downward direction and a leftward/rightward direction. In some embodiments, the additional stroke may be a compound stroke (e.g., consisting of several simple strokes), wherein the direction module 350 may determine a direction of each component of the compound stroke (e.g., each simple stroke of the compound stroke).

In certain embodiments, determining the direction includes determining an orientation of the additional stroke. For example, the direction module 350 may classify the additional stroke as being horizontal, vertical, or diagonal. In some embodiments, the direction module 350 may estimate an angle of the additional stroke and compare the estimated angle to one or more thresholds in order to determine whether the additional stroke is horizontal, vertical, diagonal, or the like.

In certain embodiments, the direction module 350 may indicate the determined direction to the refresh module 220, wherein the refresh module 220 updates the hint list further based determined stroke direction. For example, the direction module 350 may determine that an additional stroke has a horizontal, rightward direction, wherein the refresh module 220 further updates the hint list to eliminate any characters that do not have a stroke in a horizontal, rightward direction. The direction module 350 may communicate directly with the refresh module 220 or may store the determined direction at a location in memory 130 accessible by the refresh module 220. Accordingly, the refresh module 220 may update the hint list based on input from the direction module 350, as well as from other modules including the stroke module 215, the count module 340, and/or the type module 345.

The direction module 350 may comprise hardware circuits, program code operating on a processing device, or a combination of hardware circuitry and program code. As depicted, the direction module 350 may be a component of the stroke module 215. For example, the user grasp module 335 may be a hardware component of the stroke module 215. As another example, the direction module 350 may be a subroutine of the stroke module 215. However, in other embodiments the direction module 350 may be an independent component communicatively coupled to the stroke module 215.

The comparison module 355, in one embodiment, is configured to identify a number of post-character strokes associated with each candidate character in the hint list 140 and, for each candidate character, to compare the number of post-character strokes to the number of received additional strokes. As used herein, the number of post-character strokes refers to an amount of additional strokes, beyond the character radical, required to form a particular character. The number of post-character strokes is equal to a total number of strokes required to form the character, less the number of strokes required to form the character radical (e.g., the character identified by the character module 205).

The comparison module 355 may receive the number of received additional strokes from the refresh module 220, the stroke module 215, and/or the memory 130. Then, for each candidate character in the hint list 140, the comparison module 355 may compare the number of post-character strokes previous identified to the number of additional strokes input and/or indicated by the user. For a given candidate character within the hint list 140, if the number of post-character strokes is less than the number of additional strokes, then the comparison module 355 may signal the refresh module 220 to remove the candidate character from the hint list 140. Otherwise, the comparison module 355 may signal refresh module 220 to retain the candidate character in the hint list 140 in response to the number of post-character strokes being greater than or equal to the number of additional strokes.

The comparison module 355 may comprise hardware circuits, program code operating on a processing device, or a combination of hardware circuitry and program code. As depicted, the comparison module 355 may be a component of the refresh module 220. For example, the comparison module 355 may be a hardware component of the refresh module 220. As another example, the comparison module 355 may be a subroutine of the refresh module 220. However, in other embodiments the comparison module 355 may be an independent component communicatively coupled to refresh module 220.

Figure 4A:
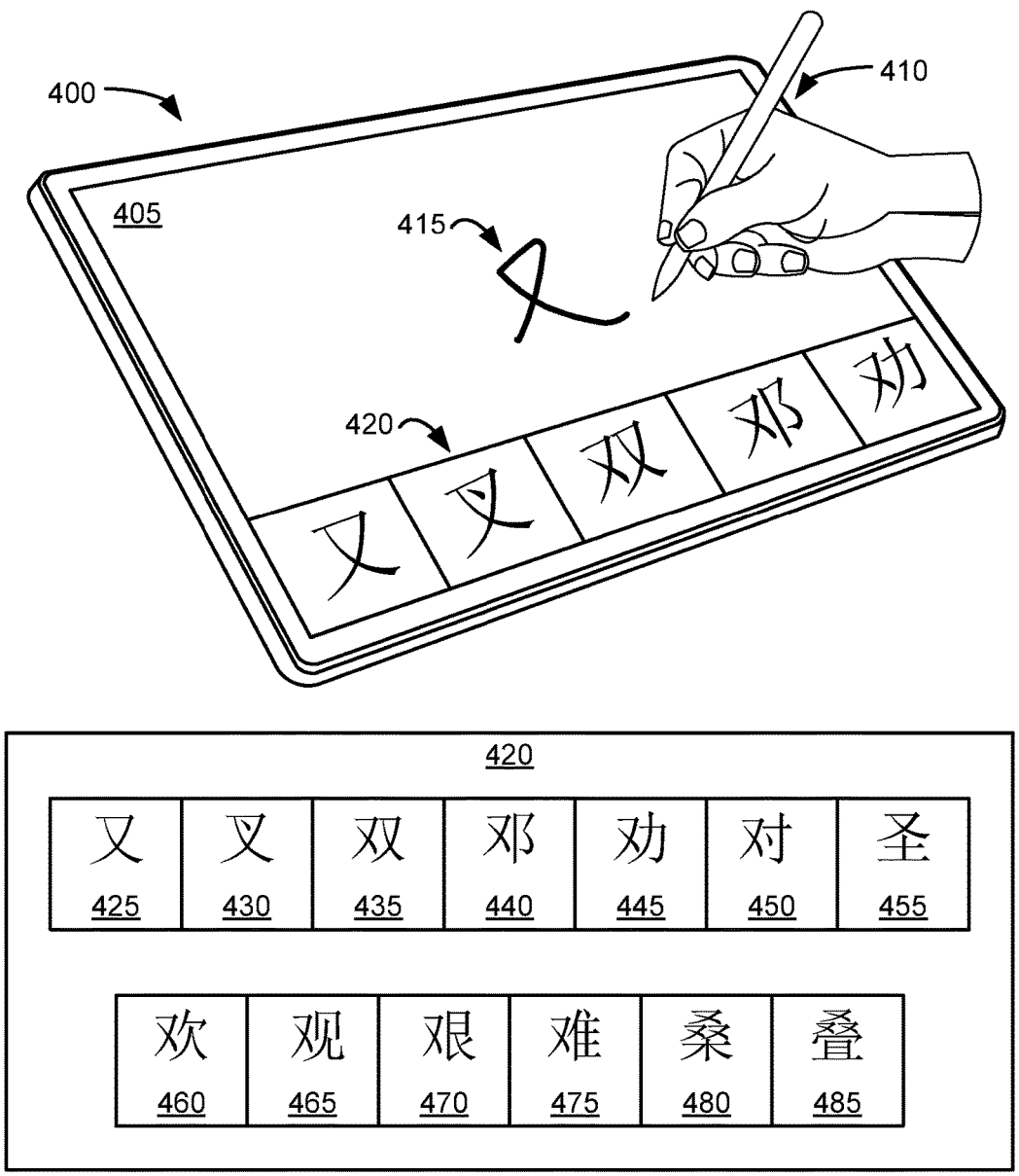
FIG. 4A is a schematic block diagram illustrating a handheld device that generates a character hint list based on a received handwritten character.

FIG. 4A is a schematic block diagram illustrating a handheld device 400 that generates a character hint list based on a received handwritten character, according to embodiments of the disclosure. The handheld device 400 includes a touchscreen display 405 capable of received user input 410. In certain embodiments, the user input 410 comprises touches and strokes from a stylus or electronic pen. In other embodiments, the user input 410 comprises touches and stokes from the finger (or other appendage) of the user. Although not shown for simplicity of illustration, the handheld device 400 includes a processor, a memory (e.g., a RAM memory and a non-volatile storage memory), and other components typical of a handheld electronic device. In some embodiments, the handheld device 400 may be substantially similar to the electronic device 105 and may include a hint list module 115, as describe above with reference to FIGS. 1-3.

The x400 receives a handwritten character 415 via user input 410. In some embodiments, the handwritten character 415 is a single-stroke character. In other embodiments, the handwritten character 415 is a multi-stroke character. In yet other embodiments, the handwritten character 415 may be a single handwriting stroke representative of a multi-stroke character. In response to receiving user input 410, the x400 may determine whether the user input 410 forms a character, such as a character radical or character sub-component.

Upon identifying that the user input 410 forms a handwritten character 415, the x400 identifies a character (e.g., Chinese character radical) corresponding to the handwritten character 415 and generates a hint list 420 based on the identified character. In some embodiments, the x400 accesses a character dictionary 135 to identify one or more characters beginning with a character radical corresponding to the handwritten character 415. In response to generating the hint list 430, the x400 may display the hint list 420 on the touchscreen display 405.

In some embodiments, only a portion of the hint list 420 is displayed. For example, there may only be enough room on the touchscreen display 405 to display five candidate characters in the hint list 420. Accordingly, the handheld device 400 may select five candidate characters (e.g., the five mostly probable candidate character, the first five candidate characters, the five simplest (e.g., by stroke count) candidate characters, or the like). As depicted, the x400 identifies the handwritten character 415 as corresponding to the Chinese character "又," generates a hint list 420 comprising candidate characters 425-485 that contain the Chinese character "又," and displays the first five character from the hint list 420. The user may then select a displayed character from the hint list 420, may continue writing the intended Chinese character (e.g., input additional strokes forming the intended character), or may otherwise indicate additional strokes, as discussed below with reference to FIGS. 4C-4E.

As depicted, the hint list 420 includes a first candidate character 425, which is the Chinese character "又," a second candidate character 430, which is the Chinese character "叉," a third candidate character 435, which is the Chinese character "双," a fourth candidate character 440, which is the Chinese character "邓," a fifth candidate character 445, which is the Chinese character "劝" a sixth candidate character 450, which is the Chinese character "对," a seventh candidate character 455, which is the Chinese character "圣," an eighth candidate character 455, which is the Chinese character "欢," a ninth candidate character 455, which is the Chinese character "观," a tenth candidate character 455, which is the Chinese character "艰," an eleventh candidate character 455, which is the Chinese character "难," a twelfth candidate character 455, which is the Chinese character "桑," and a thirteenth candidate character 455, which is the Chinese character "叠". Although the hint list 420 includes thirteen characters based on the character radical, the number of character is for illustration and other embodiments may include fewer or greater numbers of characters.

FIG. 4B is a table 490 illustrating a character dictionary including a number of post-radical strokes for each character, according to embodiments of the disclosure. The table 490 contains thirteen Chinese characters that include the character radical "又" and groups the Chinese characters according to the number of post-radical strokes (e.g., post-character strokes) of each Chinese character, thus indicating a number of radical strokes for each character. Accordingly, the table 490 may be used by the hint list module 115 and/or the x400 to determine a number of post-character strokes for each candidate character in the hint list (e.g., hint list 140 and/or hint list 420). Although the table 490 includes thirteen characters based on the character radical, the number of character is for illustration and other embodiments may include fewer or greater numbers of characters.

Figure 4C:
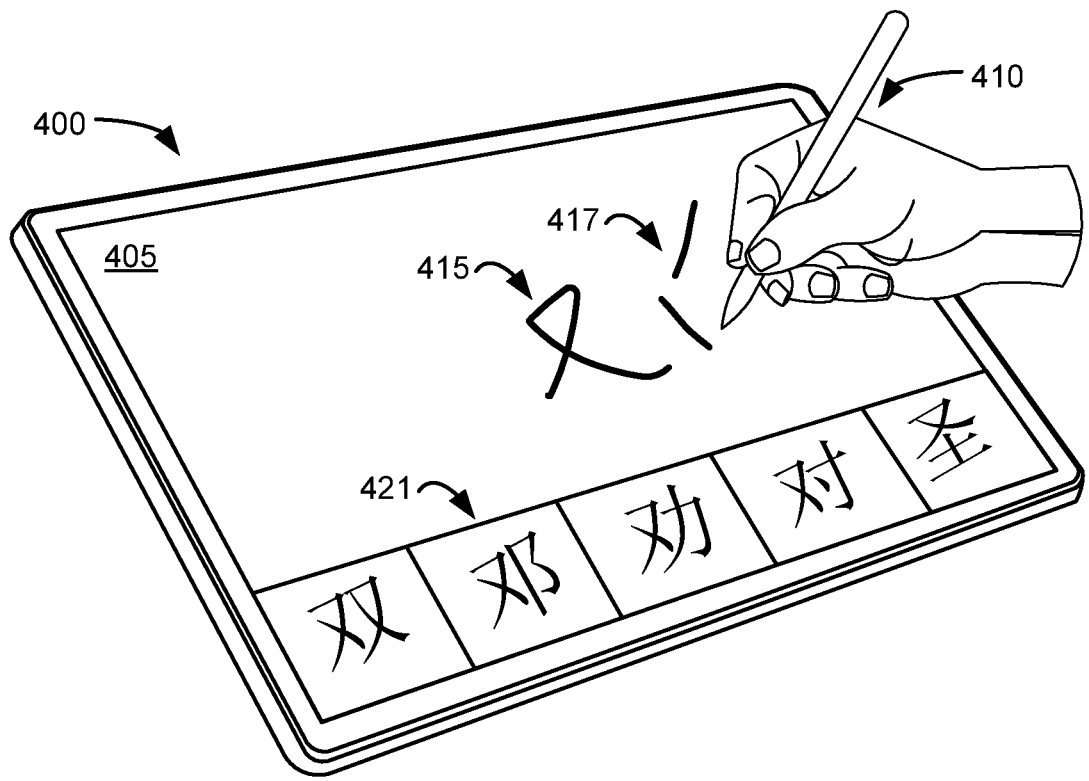
FIG. 4C is a schematic block diagram illustrating a handheld device that updates a character hint list based on a number of additional strokes.

FIG. 4C is a schematic block diagram illustrating the handheld device 400 that updates a character hint list based on a number of additional strokes, according to embodiments of the disclosure. As depicted, additional strokes 417 are received via user input 410. Here, two strokes are received. While depicted as being input adjacent to the handwritten character 415 (e.g., character radical), in other embodiments the additional strokes 417 may be input atop the handwritten character 415 or in a separate input field from the handwritten character 415. Further, while the depicted additional strokes 417 have a direction (e.g., one vertical and one diagonal), in other embodiments the same stroke (e.g., same line) may be used to represent each additional stroke of the full, intended character.

The handheld device 400 determines the number of additional strokes 417 received (here two additional strokes 417 were input) and updates the hint list 420 based on the number of additional strokes 417, thereby generating an updated hint list 421. In one embodiment, the handheld device 400 accesses the table 490 to identify a number of post-character strokes for each candidate character in the hint list 420. From the hint list 420, the handheld device 400 generates the updated hint list 421 by removing each candidate character whose number of post-character strokes (e.g., post-radical strokes) is less than the number of additional stokes 417 received via user input. As depicted, the updated. As depicted, the updated hint list 421 contains eleven characters, the candidate characters 435-485.

The handheld device 400 may then display the updated hint list 421. Where the updated hint list 421 contains more characters than there is space to present on the touchscreen display 405, the handheld device 400 may present only a portion of the updated hint list 421. The user may select a displayed candidate character from the updated hint list 421, may indicate additional strokes (e.g., input extra additional strokes 417) thereby triggering an update of the updated hint list 421, may write out the intended character in full (e.g., due to the intended character not being displayed), or the like.

Figure 4D:
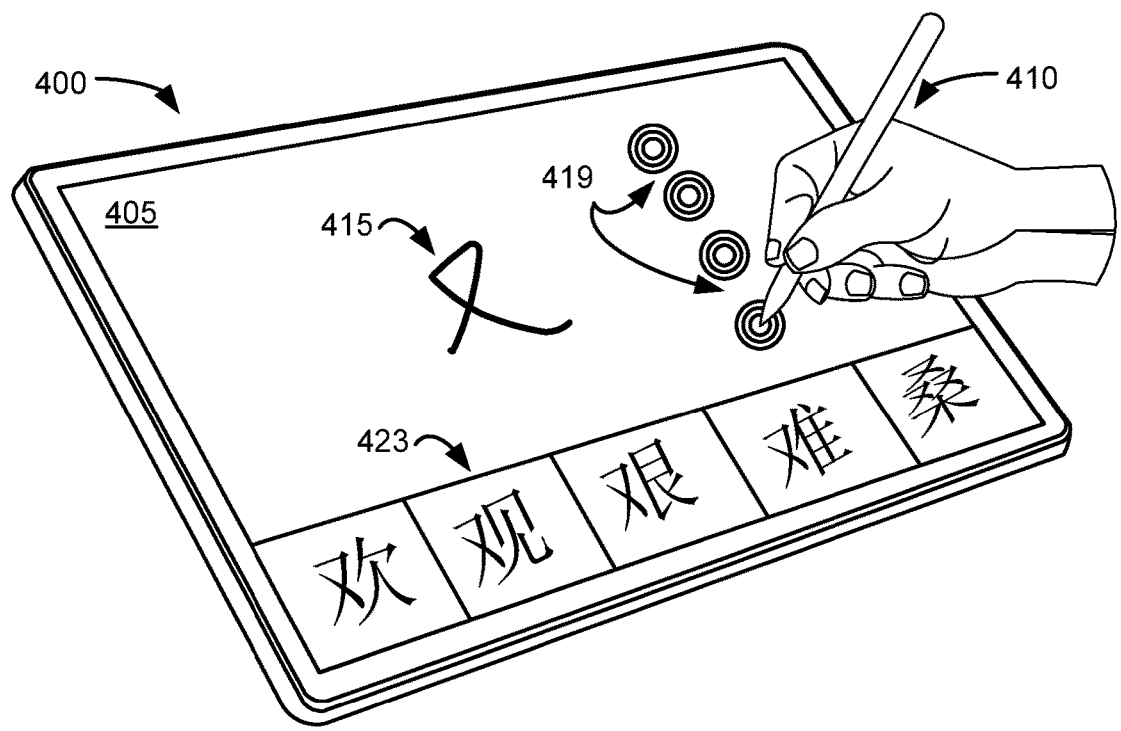
FIG. 4D is a schematic block diagram illustrating a handheld device that updates a character hint list based on a number of taps indicative of additional strokes.

FIG. 4D is a schematic block diagram illustrating the handheld device 400 that updates a character hint list based on a number of taps indicative of additional strokes, according to embodiments of the disclosure. As depicted, taps 419 are received at the touchscreen display 405 via user input 410, the taps 419 being indicative of additional strokes in the intended character. Here, four taps 419 are received. While depicted as being input adjacent to the handwritten character 415 (e.g., character radical), in other embodiments the taps 419 may be input atop the handwritten character 415 or in a separate input field from the handwritten character 415. Additionally, while the depicted taps 419 are shown as being input in a vertical line on the touchscreen display 405, in other embodiments the user may tap the same spot four times in order to input the four taps 419.

The handheld device 400 determines the number of taps 419 received (here four taps 419 were input) and updates the hint list 420 based on the number of taps 419, thereby generating an updated hint list 423. In one embodiment, the handheld device 400 accesses the table 490 to identify a number of post-character strokes for each candidate character in the hint list 420. From the hint list 420, the handheld device 400 generates the updated hint list 423 by removing each candidate character whose number of post-character strokes (e.g., post-radical strokes) is less than the number of taps 419 received via user input. As depicted, the updated. As depicted, the updated hint list 423 contains six characters, the candidate characters 460-485.

The handheld device 400 may then display the updated hint list 423. Where the updated hint list 423 contains more characters than there is space to present on the touchscreen display 405, the handheld device 400 may present only a portion of the updated hint list 423. The user may select a displayed candidate character from the updated hint list 423, may indicate additional strokes (e.g., input additional taps) thereby triggering an update of the updated hint list 423, may write out the intended character in full (e.g., due to the intended character not being displayed), or the like.

Figure 4E:
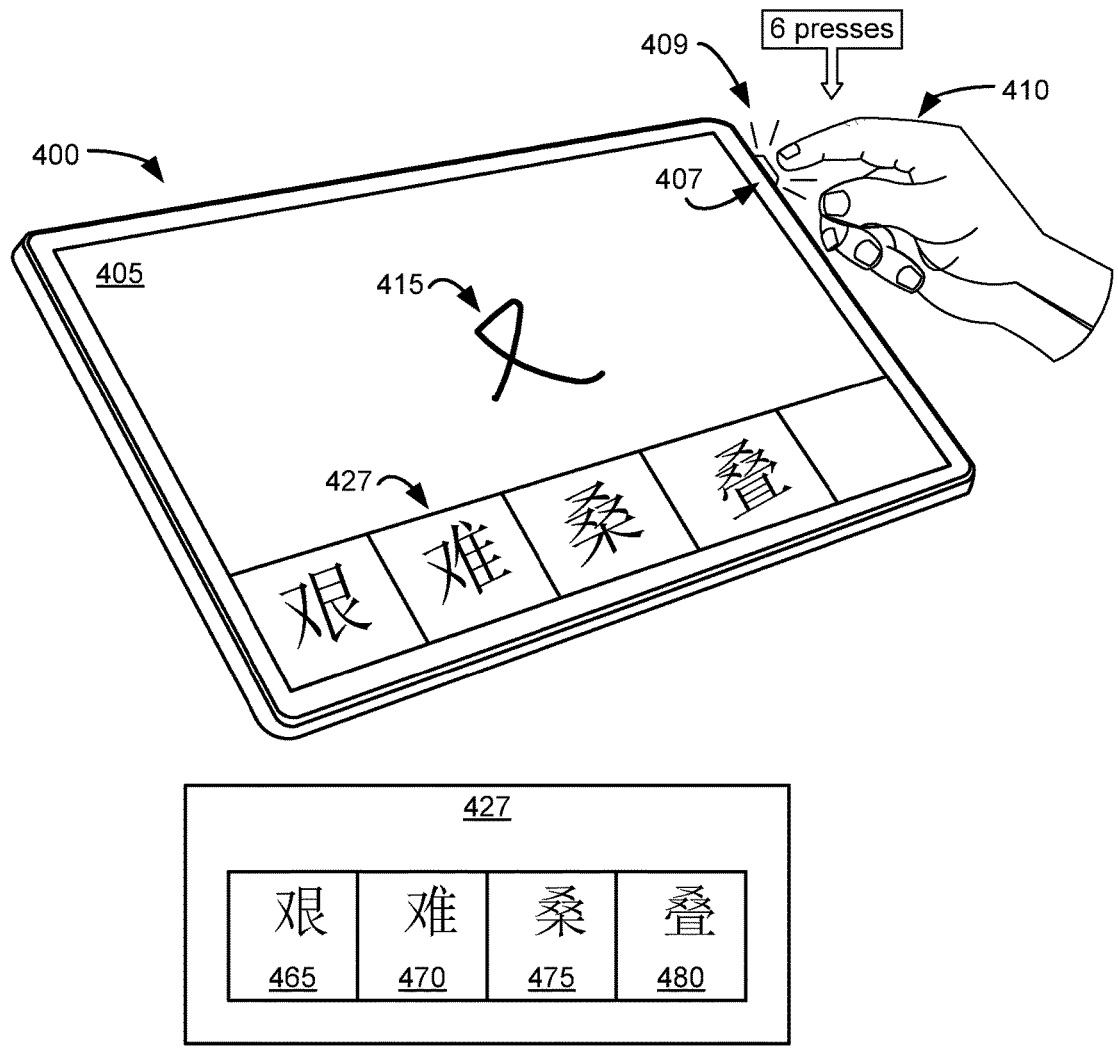
FIG. 4E is a schematic block diagram illustrating a handheld device that updates a character hint list based on a number of button presses indicative of additional strokes.

FIG. 4E is a schematic block diagram illustrating the handheld device 400 that updates a character hint list based on a number of button presses indicative of additional strokes, according to embodiments of the disclosure. As depicted, the handheld device 400 may include a button 407 for indicating additional strokes (e.g., strokes required to complete the intended character after inputting the handwritten character 415).

After inputting the handwritten character, the user input 410 may include button presses 409 to indicate additional strokes, each button press 409 being indicative of an additional stroke in the intended character. Here, six button presses 409 are received. In other embodiments, other amounts of button presses 409 may be received via user input 410. While shown as a physical button 407, in other embodiments the button 407 may be a soft key displayed on the touchscreen display 405 (e.g., a region of the touchscreen display 405 for receiving button presses 409 to a displayed button image).

The handheld device 400 determines the number of button presses 409 received (here six button presses 409 were input) and updates the hint list 420 based on the number of button presses 409, thereby generating an updated hint list 427. In one embodiment, the handheld device 400 accesses the table 490 to identify a number of post-character strokes for each candidate character in the hint list 420. From the hint list 420, the handheld device 400 generates the updated hint list 427 by removing each candidate character whose number of post-character strokes (e.g., post-radical strokes) is less than the number of button presses 409 received via user input. As depicted, the updated. As depicted, the updated hint list 427 contains six characters, the candidate characters 460-485.

The handheld device 400 may then display the updated hint list 427. Where the updated hint list 427 contains more characters than there is space to present on the touchscreen display 405, the handheld device 400 may present only a portion of the updated hint list 427. The user may select a displayed candidate character from the updated hint list 427, may indicate additional strokes (e.g., input additional taps) thereby triggering an update of the updated hint list 427, may write out the intended character in full (e.g., due to the intended character not being displayed), or the like.

Figure 5:
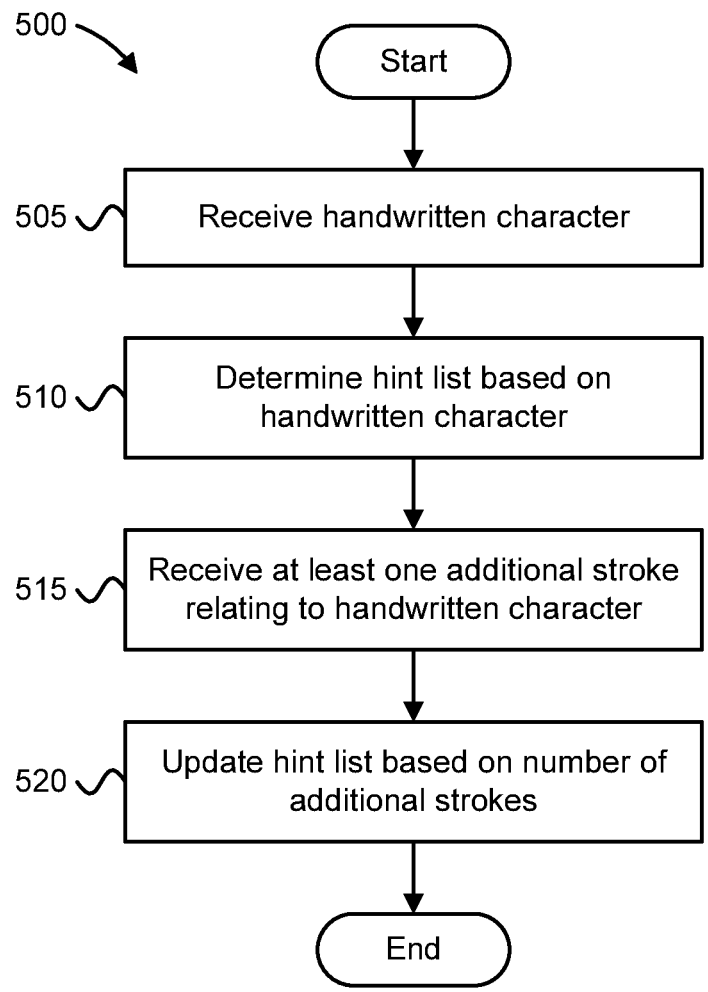
FIG. 5 is a schematic flow chart diagram illustrating one embodiment of a method for updating a character hint list based on a number of additional strokes.

FIG. 5 is a schematic flow chart diagram illustrating a method 500 for updating a character hint list based on a number of additional strokes, according to embodiments of the disclosure. In one embodiment, the method 500 is performed by the electronic device 105. In another embodiment, the method 500 may be performed by the hint list apparatuses 200 and/or 300. Alternatively, the method 500 may be performed by a processor 110 and a computer readable storage medium, such as the memory 130. The computer readable storage medium may store code that is executed on the processor 110 to perform the functions of the method 500.

The method 500 begins and receives 505 a handwritten character. For example, the character module 205 may receive 505 a handwritten character from the input device 120. The character may be a character radical (or other sub-character). In some embodiments, receiving 505 the handwritten character may include receiving one or more handwritten strokes from the input device 120 and recognizing a character radical from the stroke(s). In certain embodiments, where the one or more handwritten strokes does not make a character radical (e.g., where the one or more handwritten strokes are not recognized as a character radical), then receiving 505 the handwritten character may include awaiting additional handwritten strokes and recognizing a character radical from the combination of strokes.

The method 500 then determines 510 a hint list based on the handwritten character. In one embodiment, the list module 210 may determine 510 a hint list 140 based on the handwritten character. In some embodiments, the hint list 140 includes at least one entry. In some embodiments, determining 510 the hint list 140 based on the handwriting character includes parsing a character dictionary 135 to identify one or more candidate characters listed under the handwritten character.

The method 500 then receives 515 at least one additional stroke relating to the handwritten character. In one embodiment, the stroke module 215 may receive 515 the at least one additional stroke relating to the handwritten character. In some embodiments, at least one additional stroke is received after the user and writes the character. In certain embodiments, the user inputs the additional stroke with a finger, stylus, or electronic pen. In another embodiment meant, the user inputs the at least one additional stroke by pressing a button indicative of additional strokes and/or tapping a touchscreen to indicate additional strokes.

The method 500 and updates 520 the hint list based on a number of received additional strokes and the method 500 ends. In one embodiment, the refresh module 220 updates 520 the hint list 140 based on the number of received additional strokes. In some embodiments, updating 520 the hint list 140 based on the number of received additional strokes includes identifying a number of post-character strokes corresponding to each entry (e.g., candidate character) in the hint list 140 and removing each entry whose number of post-character strokes is less than the received number of additional strokes. For example, after inputting a handwritten character corresponding to a Chinese character radical, the user may input and/or indicate six additional strokes. The refresh module 220 may then remove from the hint list 140 each candidate character having less than six additional strokes after the character radical.

Figure 6:
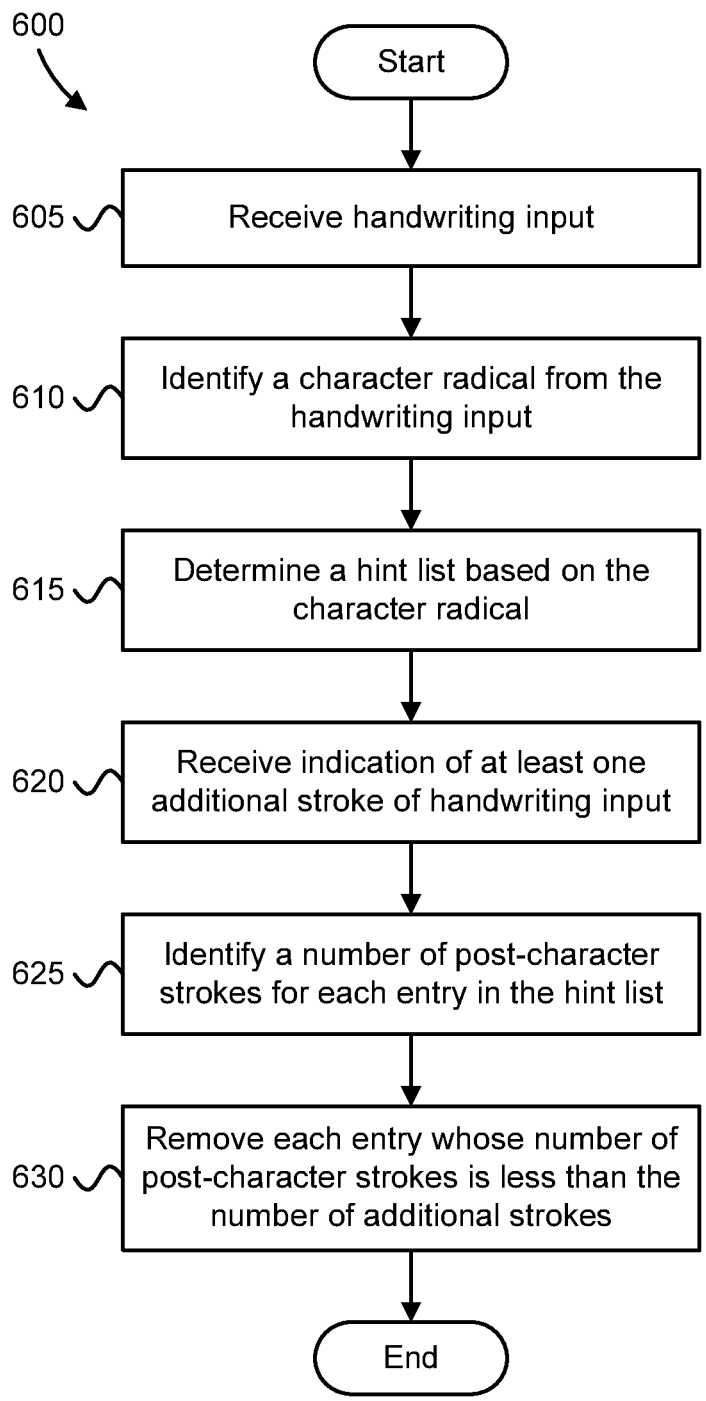
FIG. 6 is a schematic flow chart diagram illustrating another embodiment of a method for updating a character hint list based on a number of additional strokes.

FIG. 6 is a schematic flow chart diagram illustrating a method 600 for updating a character hint list based on a number of additional strokes. In one embodiment, the method 600 is performed by the electronic device 105. In another embodiment, the method 600 may be performed by the hint list apparatuses 200 and/or 300. Alternatively, the method 600 may be performed by a processor 110 and a computer readable storage medium, such as the memory 130. The computer readable storage medium may store code that is executed on the processor 110 to perform the functions of the method 600.

The method 600 begins and receives 605 handwriting input. In one embodiment, the character module 205 receives 605 handwriting input from the input device 120. In some embodiments, the handwriting input comprises one or more strokes. In certain embodiments, the handwriting input comprises input from the user's finger. In other embodiments, the handwriting input comprises input from a stylus or electronic pen.

The method 600 identifies 610 a character radical from the handwriting input. In one embodiment, the identification module 310 identifies 610 the character radical from the handwriting input. In some embodiments, the character radical may be a Chinese character radical.

The method 600 determines 615 a hint list based on the character radical. In one embodiment, the list module 210 determines 615 the hint list 140 based on the character radical. In some embodiments, determining 615 the hint list based on the character radical includes parsing a character dictionary 135 for characters listed under the identified character radical. In certain embodiments, determining 615 hint list based on the character radical includes identifying one or more candidate characters within the character dictionary 135, wherein the candidate characters begin with the identified character radical (e.g., based on a writing order).

The method 600 receives 620 an indication of at least one additional stroke of handwriting input. In one embodiment, the stroke module 215 receives 620 the indication of at least one additional stroke of handwriting input. In some embodiments, receiving 620 an indication of at least one additional stroke of handwriting input includes identifying a number of additional strokes. In certain embodiments, receiving 620 the indication of at least one additional stroke of handwriting input comprises receiving one or more additional handwritten strokes via the input device 120. In other embodiments, receiving 620 the indication of at least one additional stroke of handwriting input comprises receiving one or more taps representative of an additional stroke and/or one or more button presses representative of an additional stroke.

The method 600 identifies 625 a number of post-character strokes for each entry in hint list. In one embodiment, the refresh module 220 and/or the comparison module 355 identifies 625 the number of post-character strokes for each entry in the hint list 140. The number of post-character strokes refers to an amount of strokes required to complete each candidate character in the hint list 140 after first writing the identified character radical.

In some embodiments, identifying 625 the number of post-character strokes for each entry in the hint list includes identifying a total number of strokes required to complete each candidate character (e.g., entry) in the hint list 140 and identifying a number of strokes required to complete the identified character radical. For example, if a particular character requires eight strokes and the character radical for the particular character requires two strokes, then the number of post-character strokes would be six. In certain embodiments, identifying 625 the number of post-character strokes for each entry in hint list includes accessing a character dictionary 135, wherein the character dictionary 135 includes information on the number of strokes required to complete a character.

The method 600 removes 630 each entry whose number of post-character strokes is less than the number of additional strokes. The method 600 ends. In one embodiment, the refresh module 220 and/or the comparison module 355 removes 630 each entry whose number of post-character strokes is less than the number of additional strokes.

Figure 7:
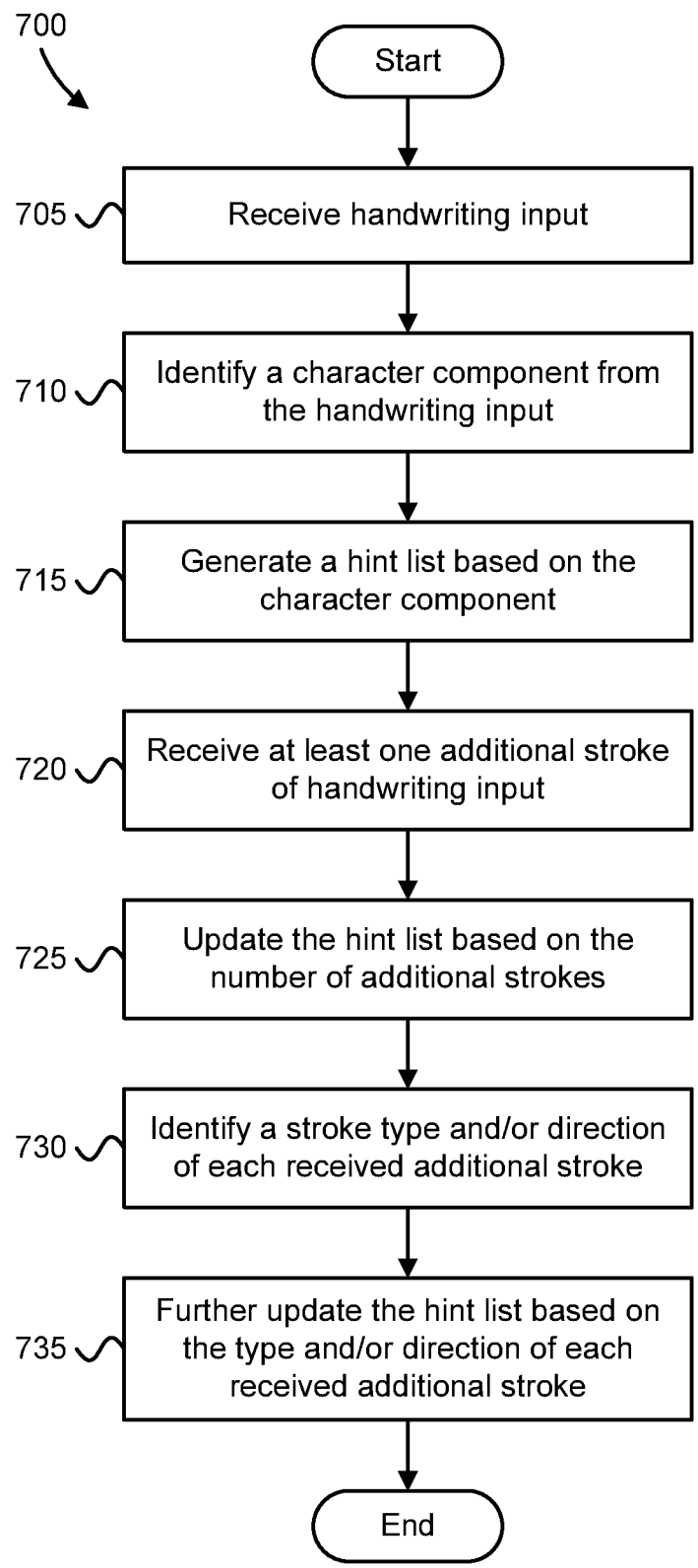
FIG. 7 is a schematic flow chart diagram illustrating one embodiment of a method for updating a character hint list based on a number of additional strokes and based on a stroke type and/or direction.

FIG. 7 is a schematic flow chart diagram illustrating a method 700 for updating a character hint list based on a number of additional strokes. In one embodiment, the method 700 is performed by the electronic device 105. In another embodiment, the method 700 may be performed by the hint list apparatuses 200 and/or 300. Alternatively, the method 700 may be performed by a processor 110 and a computer readable storage medium, such as the memory 130. The computer readable storage medium may store code that is executed on the processor 110 to perform the functions of the method 700.

The method 700 begins and receives 705 handwriting input. In one embodiment, the character module 205 receives 705 handwriting input from the input device 120. In some embodiments, the handwriting input comprises one or more strokes. In certain embodiments, the handwriting input comprises input from the user's finger. In other embodiments, the handwriting input comprises input from a stylus or electronic pen.

The method 700 identifies 710 a character component from the handwriting input. In one embodiment, the identification module 310 identifies 710 the character component from the handwriting input. In some embodiments, the character component may be a Chinese character radical.

The method 700 generates 715 a hint list based on the character component. In one embodiment, the list module 210 generates 715 a hint list 140 based on the character component. In some embodiments, generating 715 the hint list based on the character component includes parsing a character dictionary 135 for characters listed under the identified character component. In certain embodiments, generating 715 the hint list based on the character component includes identifying one or more candidate characters within the character dictionary 135, wherein the candidate characters begin with the identified character component (e.g., based on a writing order of the candidate characters). In one embodiment, the candidate characters are Chinese characters.

The method 700 receives 720 at least one additional stroke of handwriting input. In one embodiment, the stroke module 215 receives 720 at least one additional stroke of handwriting input via the input device 120. In some embodiments, receiving 720 at least one additional stroke of handwriting input includes identifying a number of additional strokes.

The method 700 updates 725 the hint list based on the number of received additional strokes. In one embodiment, the refresh module 220 updates 725 the hint list based on the number of received additional strokes. In some embodiments, updating 725 the hint list 140 based on the number of received additional strokes includes identifying a number of post-character strokes for each candidate character in the hint list 140. Updating 725 the hint list 140 based on the number of received additional strokes may further include removing a candidate character from the hint list 140 in response to that characters number of post-character strokes being less than the number of received additional strokes.

The method 700 identifies 730 a stroke type and/or a stroke direction of each received additional stroke. In one embodiment, the type module 345 may identify 730 a stroke type of each received additional stroke. In another embodiment, the direction module 350 may identify 730 a stroke direction of each received additional stroke.

The method 700 further updates 735 the hint list based on the stroke type and/or stroke direction of each received additional stroke. The method 700 ends. In one embodiment, the refresh module 220 may further updates 735 the hint list 140 based on the stroke type and/or stroke direction of each received additional stroke. In some embodiments, further updating 735 the hint list 140 based on the stroke type and/or stroke direction includes identifying a next stroke for each candidate character in the hint list 140 and identifying a stroke type and/or a stroke direction of the next stroke.

If the stroke type and/or stroke direction of the next stroke of a candidate character matches the stroke type and/or stroke direction the next received additional stroke, then the candidate character remains in the hint list 140. Otherwise, if the stroke type and/or stroke direction of the next stroke of the candidate character does not match the stroke type and/or stroke direction of the next received additional stroke, then the candidate character is removed from the hint list 140.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a touch-sensitive input panel for receiving a handwritten sub-character, the handwritten sub-character comprising one or more character strokes;
    a processor;
    a memory that stores code executable by the processor to:
    determine a hint list based on the handwritten sub-character, the hint list comprising at least one entry, each entry being a character that comprises the handwritten sub-character;
    identify a number of post-character strokes corresponding to each entry in the hint list, a post-character stroke being a stroke added to the sub-character to form the entry;
    receive at least one indication of an additional stroke relating to the handwritten sub-character, wherein the indication of an additional stroke is a different input than a character stroke, said indication selected from the group consisting of: a tap that represents an additional character stroke and does not indicate a specific character stroke at a location of the touch-sensitive input panel adjacent to a location of the handwritten sub-character and a button press that represents an additional character stroke and does not indicate a specific character stroke; and
    update the hint list based on a number of additional strokes determined using the at least one indication of an additional stroke, wherein updating the hint list based on the number of additional strokes comprises removing each entry in the hint list whose number of post-character strokes is less than the number of additional strokes.

2. The apparatus of claim 1, wherein receiving the at least one indication of an additional stroke comprises receiving input at a separate field of the touch-sensitive input panel than that used to input the handwritten sub-character.

3. The apparatus of claim 1, wherein determining a hint list based on the handwritten sub-character comprises:
    retrieving a list of candidate characters that include the handwritten sub-character;
    identifying a writing order of each candidate character in the list of candidate characters; and
    determining, for each candidate character in the list of candidate characters, whether the candidate character begins with the handwritten sub-character based on the writing order for that candidate character.

4. The apparatus of claim 1, wherein receiving the at least one indication of an additional stroke relating to the handwritten sub-character comprises receiving at least one tap that represents an additional character stroke and does not indicate a specific character stroke, said at least one tap received at a location of the touch-sensitive input panel adjacent to an input location of the sub-character, wherein updating the hint list based on the number of additional strokes comprises updating the hint list based on a received number of taps.

5. The apparatus of claim 4, wherein receiving at least one tap that is not a character stroke comprises receiving input at a separate field of the touch-sensitive input panel than that used to input the handwritten sub-character.

6. The apparatus of claim 1, further comprising a button that represents an additional character stroke and does not indicate a specific character stroke, wherein receiving the at least one indication of an additional stroke relating to the handwritten sub-character comprises receiving button input corresponding to a press of the button, wherein updating the hint list based on the number of additional strokes comprises updating the hint list based on a received number of button presses.

7. The apparatus of claim 6, wherein the button is separate from the touch-sensitive input panel.

8. The apparatus of claim 1, wherein the handwritten sub-character is a Chinese radical.

9. A method comprising:
receiving, by use of a processor, a handwritten sub-character, the handwritten sub-character comprising one or more character strokes;
determining a hint list based on the handwritten sub-character, the hint list comprising at least one entry, each entry being a character that comprises the handwritten sub-character;
identifying a number of post-character strokes corresponding to each entry in the hint list, a post-character stroke being a stroke added to the sub-character to form the entry;
receiving the at least one indication of an additional stroke relating to the handwritten sub-character, wherein the at least one indication of an additional stroke is a different input than a character stroke, said indication selected from the group consisting of: a tap that represents an additional character stroke and does not indicate a specific character stroke at a location of the touch-sensitive input panel adjacent to a location of the handwritten sub-character, a button press that represents an additional character stroke and does not indicate a specific character stroke; and
updating the hint list based on a number of additional strokes determined using the at least one indication of an additional stroke, wherein updating the hint list based on the number of additional strokes comprises removing each entry in the hint list whose number of post-character strokes is less than the number of additional strokes.

10. The method of claim 9, wherein receiving the at least one indication of an additional stroke comprises receiving input at a separate field of the touch-sensitive input panel than that used to input the handwritten sub-character.

11. The method of claim 9, wherein determining a hint list based on the handwritten sub-character comprises:
retrieving a list of candidate characters that include the handwritten sub-character;
identifying a writing order of each candidate character; and
determining, for each candidate character in the list of candidate characters, whether the candidate character begins with the handwritten sub-character based on the writing order for that candidate character.

12. The method of claim 9, wherein receiving the at least one indication of an additional stroke relating to the handwritten sub-character comprises receiving at least one tap that represents an additional character stroke and does not indicate a specific character stroke, said at least one tap received at a location of the touch-sensitive input panel adjacent to an input location of the sub-character, wherein updating the hint list based on the number of additional strokes comprises updating the hint list based on a received number of taps.

13. The method of claim 12, wherein receiving a handwritten sub-character comprises receiving handwriting input at a touch-sensitive input panel and wherein receiving at least one tap comprises receiving input at a separate field of the touch-sensitive input panel than that used to input the handwritten sub-character.

14. The method of claim 9, wherein receiving a handwritten sub-character comprises:
receiving handwriting input;
determining whether the handwriting input forms a handwritten sub-character;
identifying a character radical corresponding to the handwritten sub-character in response to the handwriting input forming a handwritten sub-character; and
monitoring for another stroke of handwriting input in response to handwriting input not forming a handwritten sub-character.

15. The method of claim 9, wherein the wherein the handwritten sub-character comprises a Chinese radical.

16. The method of claim 9, wherein receiving the at least one indication of an additional stroke relating to the handwritten sub-character comprises receiving at least one press of a button that represents an additional character stroke and does not indicate a specific character stroke, wherein updating the hint list based on the number of additional strokes comprises updating the hint list based on a received number of button presses.

17. A program product comprising a computer readable storage medium that is not a transitory signal and that stores code executable by a processor, the executable code comprising code to perform:
receiving a handwritten sub-character at a touch-sensitive input panel, the handwritten sub-character comprising one or more character strokes;
determining a hint list based on the handwritten sub-character, the hint list comprising at least one entry, each entry being a character that comprises the handwritten sub-character;
identifying a number of post-character strokes corresponding to each entry in the hint list, a post-character stroke being a stroke added to the sub-character to form the entry;
receiving one or more taps at the touch-sensitive input panel indicating at least one additional stroke relating to the handwritten character, the one or more taps being a different input than a character stroke, each tap representing an additional character stroke without indicating a specific character stroke; and
updating the hint list based on a number of additional strokes determined from the one or more taps, wherein updating the hint list based on the number of additional strokes comprises removing each entry in the hint list whose number of post-character strokes is less than the number of additional strokes.

18. The program product of claim 17, wherein determining a hint list based on the handwritten character comprises:
retrieving a list of candidate characters that include the handwritten character;
identifying a writing order of each candidate character; and
determining, for each candidate character in the list of candidate characters, whether the candidate character begins with the handwritten character based on the writing order for that candidate character.

19. The program product of claim 17, wherein receiving one or more taps at the touch-sensitive input panel indicating at least one additional stroke relating to the handwritten character comprises receiving input at a separate field of the touch-sensitive input panel than that used to input the handwritten sub-character.

* * * * *